Sept. 26, 1939.   J. J. HARKINS   2,174,034
EDUCATIONAL GAME
Filed Sept. 22, 1938
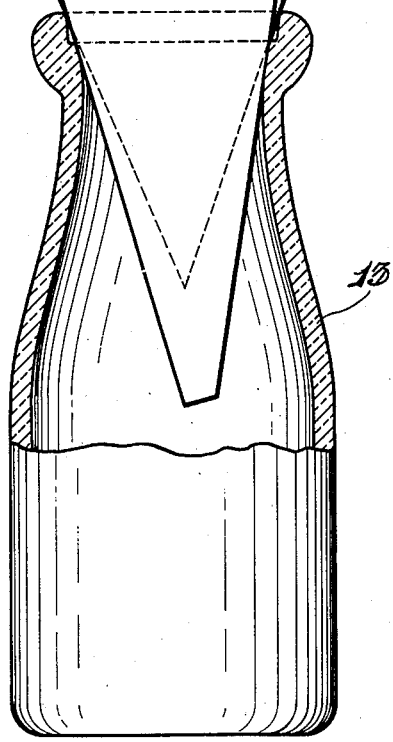
INVENTOR
James J. Harkins
BY Martin J. Manion
ATTORNEY Patented Sept. 26, 1939

2,174,034

UNITED STATES PATENT OFFICE 2,174,034

EDUCATIONAL GAME

James J. Harkins, Wheeling, W. Va.

Application September 22, 1938, Serial No. 231,129

2 Claims. (Cl. 35—9)

This invention relates broadly to educational games, and more particularly to a game whereby instruction in history, geography, religion, sports, and the like, may be afforded.

One of the objects of the invention is to provide a game which, while instructive and educational, is at the same time entertaining and amusing, thus appealing to adults as well as children.

Another object of the invention is to provide a game played by the question and answer method, the accuracy of the answers being proved or disproved in a unique and novel manner.

Other and further objects of the invention will appear from the detailed description which follows. In describing the invention in detail, reference is herein had to the accompanying drawing, in which—

Figure 1 is a face view of one of the series or sets of question cards with which the game is played;

Figure 2 is a face view of one of the series or sets of answer cards with which the game is played; and Figure 3 is a front face view of a question and answer card disposed within the mouth of a receptacle illustrating the manner of proving or disproving the correctness of the answers.

The game is played with a plurality of question cards, preferably made of cardboard. A typical question card is illustrated at 3 in Figure 1 of the drawing. While the shape of the card depicted in Figure 1 is that of a trapezoid, it is possible to use any number of geometrical shapes, as a triangle, trapezium, rhomboid, or any other shape wherein the two opposite, non-parallel sides downwardly converge toward each other.

Each of the plurality of question cards 3 bears a question printed on its face, the question relating to a matter pertaining to history, geography, religion, sports, or any other desired subject. An aperture 4 is provided in the face of each card at a predetermined location.

For each question card in the set, there are several answer cards 5, one of which bears the corect answer to the propounded question, while the remaining cards bear incorrect answers. A typical answer card 5 is illustrated in Figure 2 of the drawing. While the shape of the answer card depicted in Figure 2 is also that of a trapezoid, it differs materialy from the trapezoidal shape of the question card of Figure 1. Likewise, it is posible to use any number of geometrical shapes, as a triangle, trapezium, or any other shape wherein the two opposite sides are non-parallel and downwardly converge toward each other. The shape of the answer cards should bear no resemblance to that of the question card to which they relate. Like the question card 3, each answer card 5 has an aperture 10 provided in its face at a predetermined location.

When playing the game, the player selects a question card from the plurality of such cards and reads the question asked. From the plurality of answer cards the player selects what is thought to be the correct answer.

To test the accuracy of the answer, the question card and the selected answer card are inserted in the mouth of a receptacle, as the milk bottle 13, in such a manner that the printed matter is in a horizontal plane. In such a position the non-parallel, downwardly convergently inclined sides of the cards will be within the neck of the receptacle. The two cards are then dropper into the receptacle and fall by gravity until their movement is stopped by the inner peripheral edge of the mouth of the container. In other words, the width of the cards at their upper portions exceeds the diameter of the mouth of the receptacle. When at the limit of their gravitation as restricted by the mouth of the receptacle the apertures 4 and 10 of the cards 3 and 5 will be in register if the correct answer card has been selected for the question card. If, however, an incorrect answer card has been selected, its aperture 10 will be out of register with the aperture 4 of the question card. This is due to the fact that the apertures 10 of the set of answer cards are so located that only the aperture of the correct card will register with the aperture 4 of the question card when placed within the mouth of the container, as hereinbefore described.

What is claimed is:

1. A set of playing cards having a geometrical shape in which two opposite sides are non-parallel and convergently incline toward each other, one of said cards having an aperture provided in its face and bearing a question printed thereon, the remaining cards bearing printed matter thereon and each having an aperture in its face, the aperture of one of said last mentioned cards being adapted to register with the aperture of said first mentioned card when both are together suspended within the embrace of an object engaging points in the opposite convergently and downwardly inclined sides of each card.

2. A set of playing cards having a geometrical shape in which two opposite sides are non-parallel and convergently incline toward each other, one of said cards having an aperture provided in its face and bearing a question printed thereon, the remaining cards of the set bearing printed matter thereon purporting to be answers to said question, one only of which is the correct answer, indicia borne by said answer cards, the indicia of the correct answer card only being adapted to register with the aperture of the question card when both are together suspended within the embrace of an object engaging points in the opposite convergently and downwardly inclined sides of each card.

JAMES J. HARKINS.